United States Patent [19]

Brewer

[11] Patent Number: 5,730,671
[45] Date of Patent: Mar. 24, 1998

[54] GEAR REDUCTION BOX

[75] Inventor: Jim J. Brewer, Amarillo, Tex.

[73] Assignee: Power Box, Inc., Amarillo, Tex.

[21] Appl. No.: 710,326

[22] Filed: Sep. 16, 1996

[51] Int. Cl.$^6$ .................................. F16H 7/02
[52] U.S. Cl. .................................. 474/85; 74/41
[58] Field of Search .................. 474/64, 66, 85, 474/88; 74/41

[56] References Cited

U.S. PATENT DOCUMENTS

| | | | |
|---|---|---|---|
| 2,526,561 | 10/1950 | Keltner | 74/41 X |
| 3,867,846 | 2/1975 | Cambern | 74/41 |
| 4,028,964 | 6/1977 | Jones | 474/88 X |
| 4,238,966 | 12/1980 | Carlson et al. | 74/41 |
| 4,454,778 | 6/1984 | Camren | 74/41 |
| 4,492,126 | 1/1985 | Davis | 74/41 |
| 4,723,452 | 2/1988 | Watson | 74/41 |
| 4,743,172 | 5/1988 | Watson | 74/41 |

FOREIGN PATENT DOCUMENTS 920159  11/1954  Germany .................... 474/88

OTHER PUBLICATIONS

"Ideal 25 H.P. Pumping Reduction Unit Type TA" The National Supply Companies Class 474/88, Sep. 1934.

Primary Examiner—Thomas R. Hannon
Attorney, Agent, or Firm—Richard C. Litman

[57] ABSTRACT

A gear reduction box designed to be integrated into an existing oil field pumping unit to reduce the gear ratio and thereby reduce the size of the motor needed to operate the pumping unit. More specifically, the invention is a gear reduction box including a base that can be mounted on an oil field pumping unit, a drive motor having a first sheave attached thereto, a pair of bearings mounted on the base and rotatably holding a drive shaft, a larger second sheave removably attached to one end of the drive shaft and connected to the first sheave by a first drive belt, and a third sheave removably attached to the opposite end of the drive shaft and connected to the oil field pumping unit by a second drive belt. The second and third sheaves can be removed and replaced with varying sizes of sheaves in order to adjust the number of strokes per minute of the oil field pumping unit.

10 Claims, 2 Drawing Sheets

GEAR REDUCTION BOX

BACKGROUND OF THE INVENTION

1. Field of the Invention

The present invention relates to a gear reduction box designed to modify an existing oil field pumping unit by reducing its gear ratio and thereby reduce the size of the motor needed to operate the pumping unit. More specifically, the invention relates to a gear reduction box with a system of gear reducing drive sheaves which can be varied in size to adjust the gear reduction ratio and the number of pumps per minute of the oil field pumping unit.

2. Description of Prior Art

Conventional pump jacks require a high torque low speed reciprocating polished rod to operate a downhole pump in order to remove oil from a well. This is usually accomplished by oscillating a horsehead on a walking beam at a low revolution per minute torque. Typically a small engine or electric motor is used to drive a flywheel upon which a pitman arm is journalled to the opposite end of the walking beam from the horsehead. In order to reduce the size of the motor needed to operate the pump, gear reduction systems have been developed. The following patents describe several types of such gear reduction systems.

U.S. Pat. No. 4,238,966, issued on Dec. 16, 1980, to Russell R. Carlson et al. discloses an integral pump operating mechanism having a high reduction drive from a continuous operating motor to a crank arm utilizing three series of belts to obtain a reduction of 190 to 1.

U.S. Pat. No. 4,454,778, issued on Jun. 19, 1984, to Virgil Camren discloses a speed reduction system, drive shaft, and motor which are mounted as a unit on a pump jack system and are claimed in combination with the overall pump jack system.

U.S. Pat. No. 4,492,126, issued on Jan. 8, 1985, to C. Arthur Davis discloses an oil field pump jack having an electric motor with a V-belt pulley which transmits power to a pulley on a countershaft and to another pulley installed on the same shaft and therefrom to another pulley on the pump driving mechanism shaft. The described power transmission allows the pump jack to produce sufficient pumping forces with a fairly small prime mover.

U.S. Pat. No. 4,723,452, issued on Feb. 9, 1988, and U.S. Pat. No. 4,743,172, issued on May 10, 1988 both to Jerry L. Watson disclose a belt driven pumping unit having a motor which drives by belt a large flywheel sheave which is connected to a large crank sheave by another endless belt, which in turn reciprocates a horsehead on a walking beam.

The above patents describe a number of gear reduction systems, yet they all fail to achieve the high degree of versatility and usefulness of the present invention. There is a need for a gear reduction box that includes a small motor mounted on a base structure along with gear reduction sheaves which can be used in place of the existing motor on an oil field pumping unit. The gear reduction box should not only reduce the size of the motor needed to operate the pumping unit, but it should also allow the user to adjust the number of pumps per minute generated by the motor. The gear reduction box should be designed such that it can be mounted on a wide variety of oil field pumping units in place of the existing motor.

None of the above inventions and patents, taken either singularly or in combination, is seen to describe the instant invention as claimed. Thus a gear reduction box solving the aforementioned problems is desired.

SUMMARY OF THE INVENTION

The present invention relates to a gear reduction box designed to reduce the gear ratio on an oil field pumping unit. More specifically, the invention relates to a gear reduction box including a base that can be mounted on an oil field pumping unit, a drive motor having a first sheave attached thereto, a pair of bearings mounted on the base and rotatably holding a drive shaft, a larger second sheave removably attached to one end of the drive shaft and connected to the first sheave by a first drive belt, and a third sheave removably attached to the opposite end of the drive shaft and connected to the oil field pumping unit by a second drive belt. The second and third sheaves can be removed and replaced with varying sizes of sheaves in order to adjust the number of pumps per minute of the oil field pumping unit.

Accordingly, it is a principal object of the invention to provide a gear reduction box which can be used to modify a wide variety of existing oil pump jacks.

It is another object of the invention to provide a gear reduction box which can be used to reduce the size of the motor needed to operate the oil pump jack.

It is a further object of the invention to provide a gear reduction box which will allow the user to vary the pumps per minute depending on their needs.

Still another object of the invention is to provide a gear reduction box which can be used in place of the existing motor on an oil pump jack and can be dismounted and used on other oil pump jacks depending on the users needs.

It is an object of the invention to provide improved elements and arrangements thereof in a gear reduction box for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
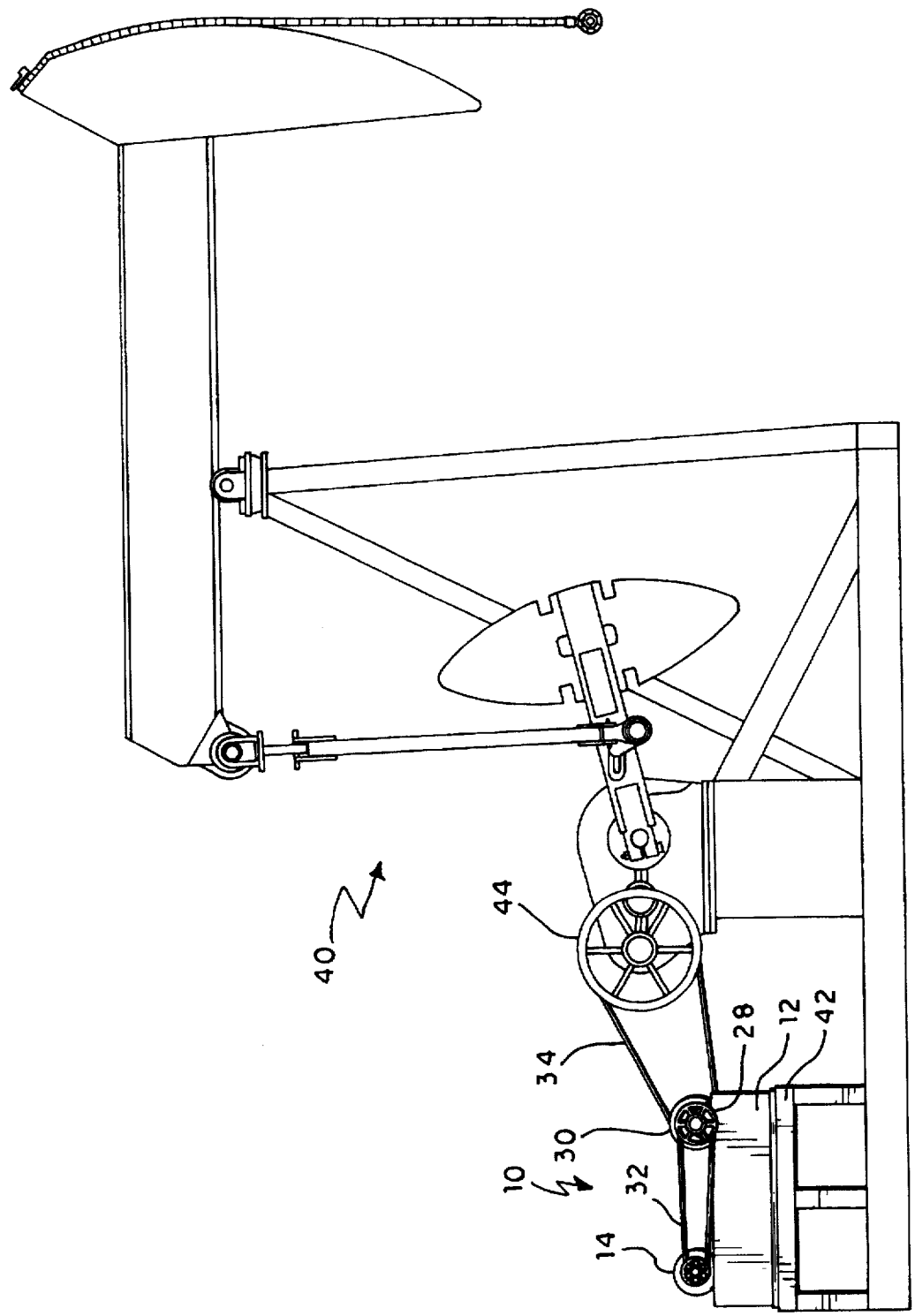
FIG. 1 is an environmental view of the gear reduction box mounted on the motor mount of a oil field pumping unit.

As shown in FIG. 1, the present invention relates to a gear reduction box 10 which can be used to modify an oil field pumping unit 40. The gear reduction box 10 is removably mounted on a motor mount 42 in place of the existing motor (not shown) and coupled to the existing flywheel 44 and gear reduction system by belt 34.

The gear reduction box 10 includes a base 12 which can be removably mounted on a motor mount 42. The preferred embodiment of the present invention has a base 12 that is weld constructed of three-eights inch flat plate steel. The dimensions of the preferred embodiment of the base 12 are twenty-four inches in width, thirty inches in length, and eight inches in height. The base 12 of the preferred embodiment is in the shape of a hollow six sided box with an open face on the bottom. The base 12 can be removably mounted to the motor mount 42 using any conventional means, thereby allowing the gear reduction box 10 to be moved between various pumping units when the need arises. In the preferred embodiment the base 12 is welded to the motor mount 42 and can be removed by cutting the base 12 free. While this is the easiest means of mounting the base 12 to the motor mount 42, other means are also possible.

Figure 2:
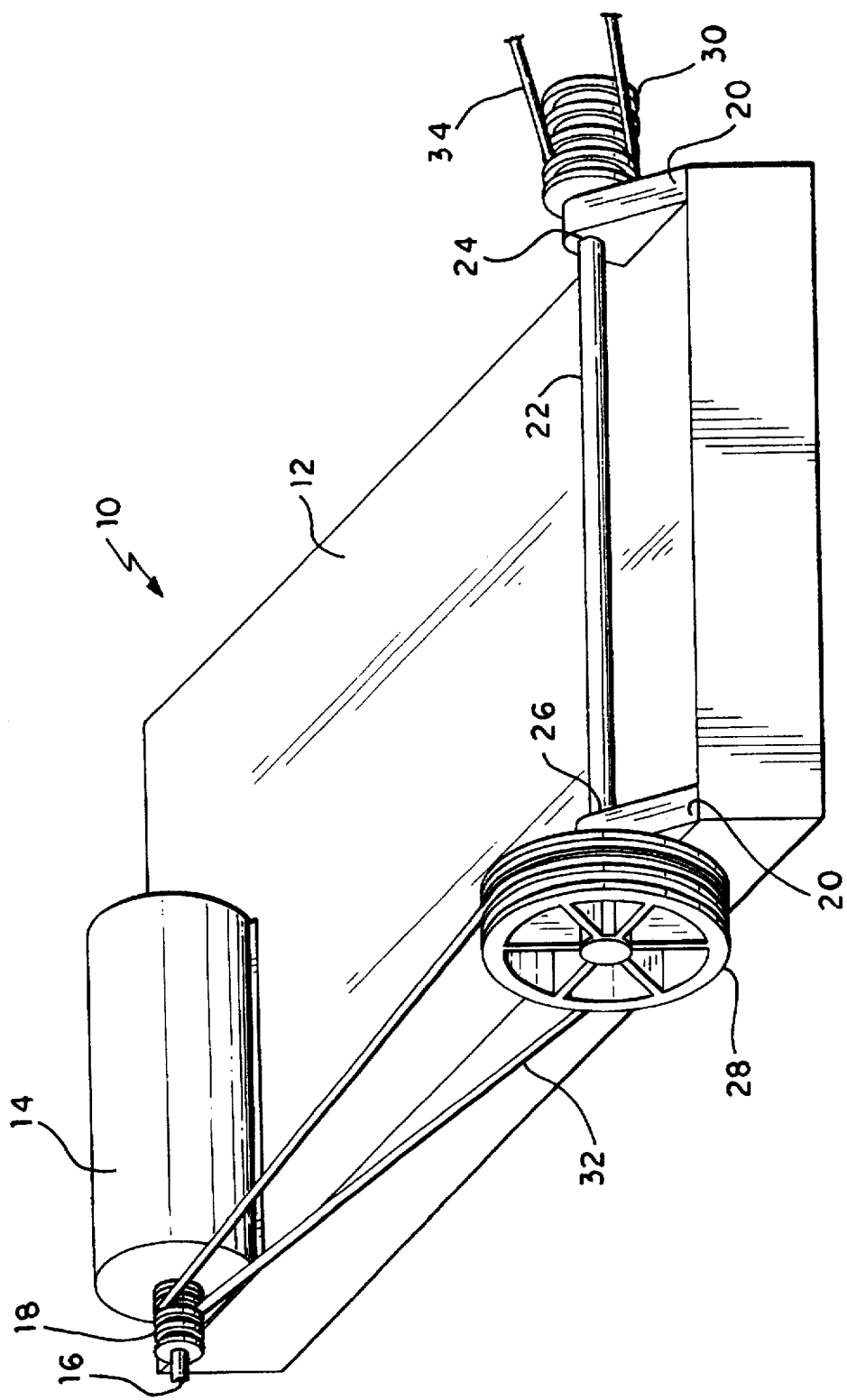
FIG. 2 is a perspective view of the gear reduction box of the present invention.

As shown in FIG. 2, a drive motor 14 is fixedly mounted in the rear corner of the base 12. The drive motor 14 has a first drive shaft 16 extending therefrom and a first drive sheave 18 attached thereto. The drive motor 14 can be either a ten or a fifteen horsepower single or triple phase electric motor depending on the needs of the user. Alternatively, other electric motor sizes or other suitable power generating devices may be used if needed.

A pair of bearings 20 are fixedly mounted on the front corners of the base 12. In the preferred embodiment the bearings 20 are two inch pillow block roller-type bearings. The bearings 20 rotatably mount a second drive shaft 22 to the base 12. In the preferred embodiment the second drive shaft is two inches in diameter and thirty-six inches in length. The second drive shaft 22 has a first end 26 and a second end 24. A second drive sheave 28 is removably attached to the first end of the second drive shaft 26. In order to get the desired gear reduction ratio the second drive sheave 28 should be larger than the first drive sheave 18. A third drive sheave 30 is removably attached to the second end of the second drive shaft 24.

The second and third drive sheaves, 28 and 30 respectively, are removably attached to the first and second ends of the second drive shaft, 26 and 24 respectively, so that they may removed and replaced with varying sizes of drive sheaves. The drive sheaves may be removably mounted on the drive shafts by any conventional mounting means. In the preferred embodiment the drive sheaves are mounted using a half inch key and locking hub. By varying the sizes of drive sheaves 28 and 30, the user can adjust gear reduction ratio thereby adjusting the number of pumps per minute of the oil field pumping unit 40.

In one embodiment of the present invention the first drive sheave 18 is four inches in diameter, the second drive sheave 28 is six inches in diameter, and the third drive sheave 30 is eight inches in diameter, as shown in FIG. 1. The sizes of the drive sheaves may be varied to achieve the desired pumping speed. Additionally, the second drive sheave 28 can be made larger than the third drive sheave 30 to further increase the overall gear reduction ratio, as shown in FIG. 2. The second and the third drive sheaves, 28 and 30 respectively, can also be interchanged with each other.

By increasing the gear reduction ratio the size of the motor needed to operate the pumping unit 40 will be decreased, thereby decreasing the energy consumption of the pumping unit. This decrease in energy consumption may significantly lower the operating costs of the pumping unit 40 since pumping units are generally run on a continuous basis and therefore require a constant energy supply.

The three drive sheaves 18, 28, and 30, are flywheel type sheaves with grooves thereon for holding a belt or belts. The drive sheaves can have either three or four grooves thereon depending on the preference of the user. In the preferred embodiment the grooves are five-eighths inch wide.

The present invention utilizes two systems of belts 32 and 34. As shown in FIG. 2 a first drive belt 32 is used to couple the first drive sheave 18 to the second drive sheave 28. A second drive belt 34 is used to couple the third drive sheave 30 to a flywheel 44 on the oil field pumping unit 40, as shown in FIG. 1. Alternatively, several belts may be used in parallel between the remaining grooves in order to achieve a stronger and more reliable coupling between the first drive sheave 18 and the second drive sheave 28 and between the third drive sheave 30 and the flywheel 44.

It is to be understood that the present invention is not limited to the embodiments described above, but encompasses any and all embodiments within the scope of the following claims.

I claim:

1. A gear reduction box for modifying an oil field pumping unit, comprising:

a rectangular base for removable mounting on the oil field pumping unit, said base having two rear corners and two front corners;

a drive motor mounted on one of said rear corners of said base, said drive motor having a first drive shaft extending therefrom;

a first drive sheave attached to said first drive shaft;

two bearings, each one of said bearings being mounted on one of said front corners of said base;

a second drive shaft having a first and a second end, said second drive shaft being rotatably mounted in said bearings, said second shaft extending across said base;

a second drive sheave attached to said first end of said second drive shaft, said second drive sheave being larger than said first drive sheave;

a third drive sheave attached to said second end of said second drive shaft;

a first drive belt connecting said first drive sheave and said second drive sheave; and a second drive belt connecting said third drive sheave to the oil field pumping unit.

2. The gear reduction box for modifying an oil field pumping unit as defined in claim 1 wherein said second drive sheave is removably attached to said first end of said second drive shaft and said third drive sheave is removably attached to said second end of said second drive shaft so that they may removed and replaced with varying sizes of drive sheaves in order to adjust the number of pumps per minute of the oil field pumping unit.

3. The gear reduction box for modifying an oil field pumping unit as defined in claim 2 wherein said first drive sheave, said second drive sheave, and said third drive sheave each have three grooves thereon.

4. The gear reduction box for modifying an oil field pumping unit as defined in claim 2 wherein said first drive sheave, said second drive sheave, and said third drive sheave each have four grooves thereon.

5. The gear reduction box for modifying an oil field pumping unit as defined in claim 2 wherein;

said first drive sheave is four inches in diameter;

said second drive sheave is six inches in diameter; and said third drive sheave is eight inches in diameter.

6. The gear reduction box for modifying an oil field pumping unit as defined in claim 2 wherein;

said first drive sheave is four inches in diameter;

said second drive sheave is eight inches in diameter; and said third drive sheave is six inches in diameter.

7. The gear reduction box for modifying an oil field pumping unit as defined in claim 2 wherein said drive motor is a ten horsepower single phase electric motor.

8. The gear reduction box for modifying an oil field pumping unit as defined in claim 2 wherein said drive motor is a fifteen horsepower single phase electric motor.

9. The gear reduction box for modifying an oil field pumping unit as defined in claim 2 wherein said drive motor is a ten horsepower triple phase electric motor.

10. The gear reduction box for modifying an oil field pumping unit as defined in claim 2 wherein said drive motor is a fifteen horsepower triple phase electric motor.

* * * * *